Dec. 1, 1959  N. MILLER  2,915,610
COMBINED DRIER CYCLER AND THERMOSTAT
Filed April 25, 1958  3 Sheets-Sheet 1

Inventor
Nicholas Miller
by Hill, Sherman, Meroni, Gross & Simpson
Attys

Dec. 1, 1959  N. MILLER  2,915,610
COMBINED DRIER CYCLER AND THERMOSTAT
Filed April 25, 1958  3 Sheets-Sheet 2
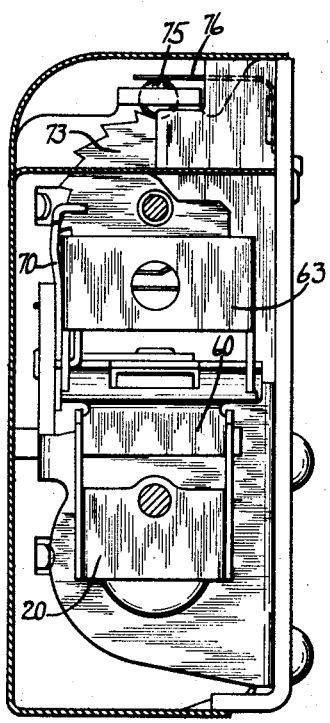
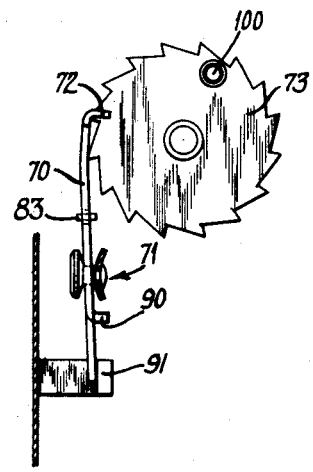
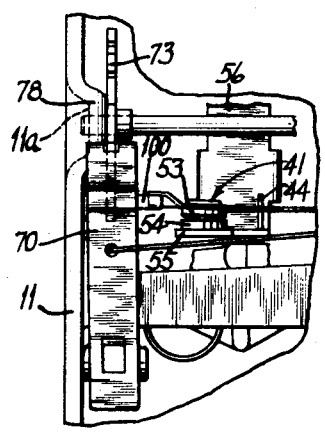
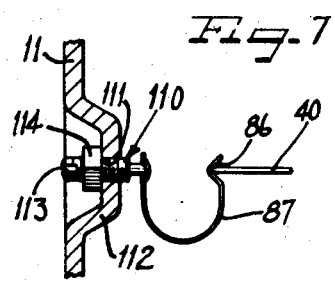
Inventor
Nicholas Miller

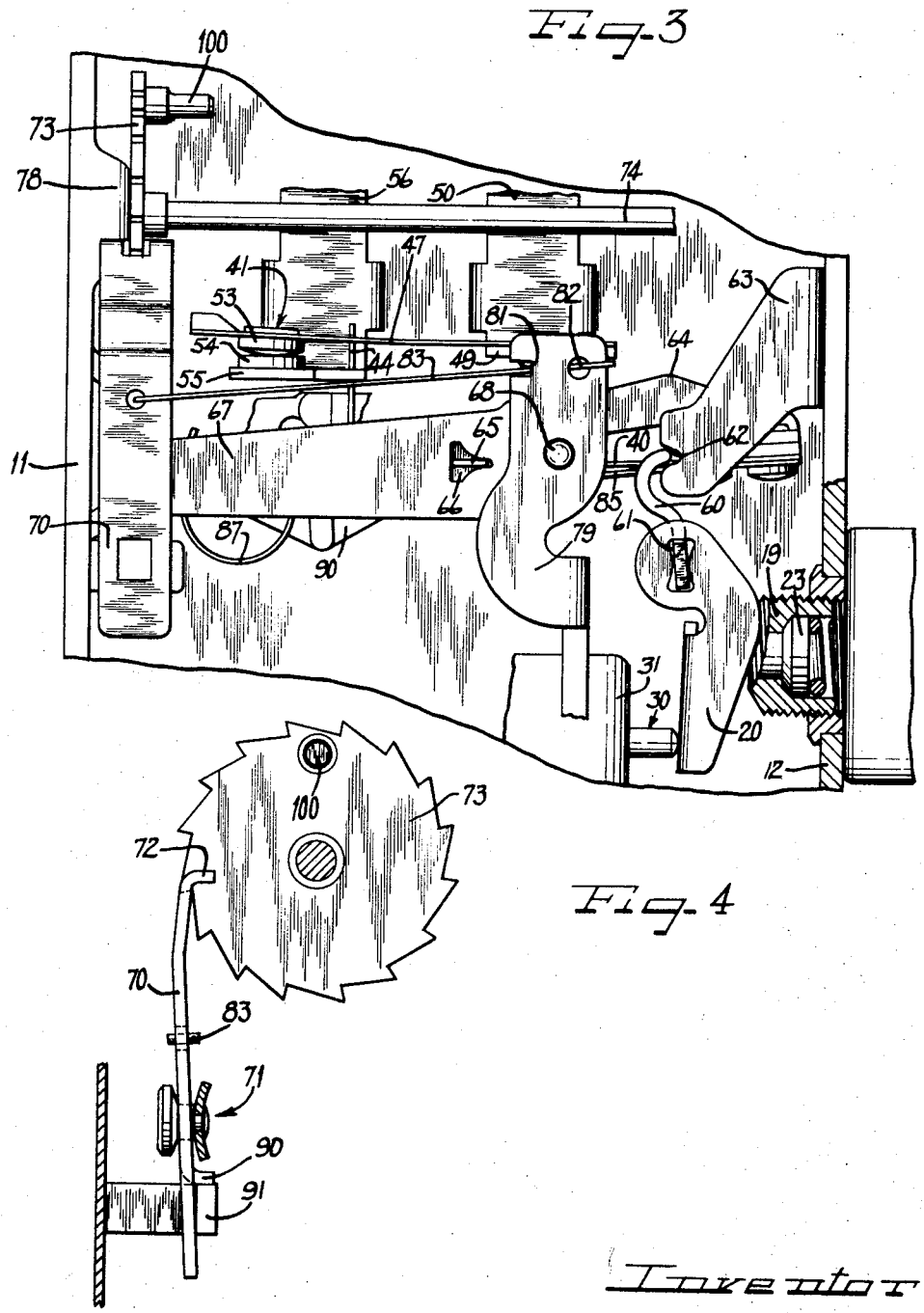

United States Patent Office 2,915,610
Patented Dec. 1, 1959

2,915,610

COMBINED DRIER CYCLER AND THERMOSTAT

Nicholas Miller, Chicago, Ill., assignor to The Dole Valve Company, Morton Grove, Ill., a corporation of Illinois Application April 25, 1958, Serial No. 730,861

9 Claims. (Cl. 200—140)

This invention relates to improvements in thermostatic control devices and more particularly relates to a combined thermostatic control and cycling device adapted for controlling the operation of driers and the like.

It is a principal object of this invention to provide a simple form of thermostatically operated switch in which the temperature of operation of the switch may be adjusted at the selection of the operator.

It is a further object of this invention to provide in combination with the aforementioned thermostatic control switch a means by which the operator may selectively predetermine the duration for which the switch will remain operable by the thermostat.

A still further object of this invention is to provide a thermostatically controlled snap action switch in combination with a cycling mechanism for driers and the like with a view toward utmost efficiency and compactness.

Another object of the present invention is to provide a combined drier cycler and thermostatic switch in which the thermostat is arranged, at periodic intervals, to open and close an electrical energizing circuit with a snapping action to prevent sticking and fusion of the contacts.

These and other objects of the invention will appear from time to time as the following specification proceeds and with reference to the accompanying drawings wherein:

Figure 2 is a partially sectioned end view through the front of the mechanism illustrating the component parts in the same position as are shown in Figure 1;

Figure 3 is a fragmentary side elevational view of the device illustrated in Figure 1 showing the electrical contacts in the closed position;

Figure 4 is a fragmentary view of the pawl and ratchet mechanism in the position illustrated in Figure 3;

Figure 5 is a view similar to Figure 4 but showing the pawl and ratchet mechanism in the position illustrated in Figure 1;

Figure 6 is a fragmentary view similar to Figures 1 and 3 but showing the parts positioned at the end of one cycle; and Figure 7 is a view of a portion of the snap blade, overcenter spring, and adjusting means therefore.

Figure 1:
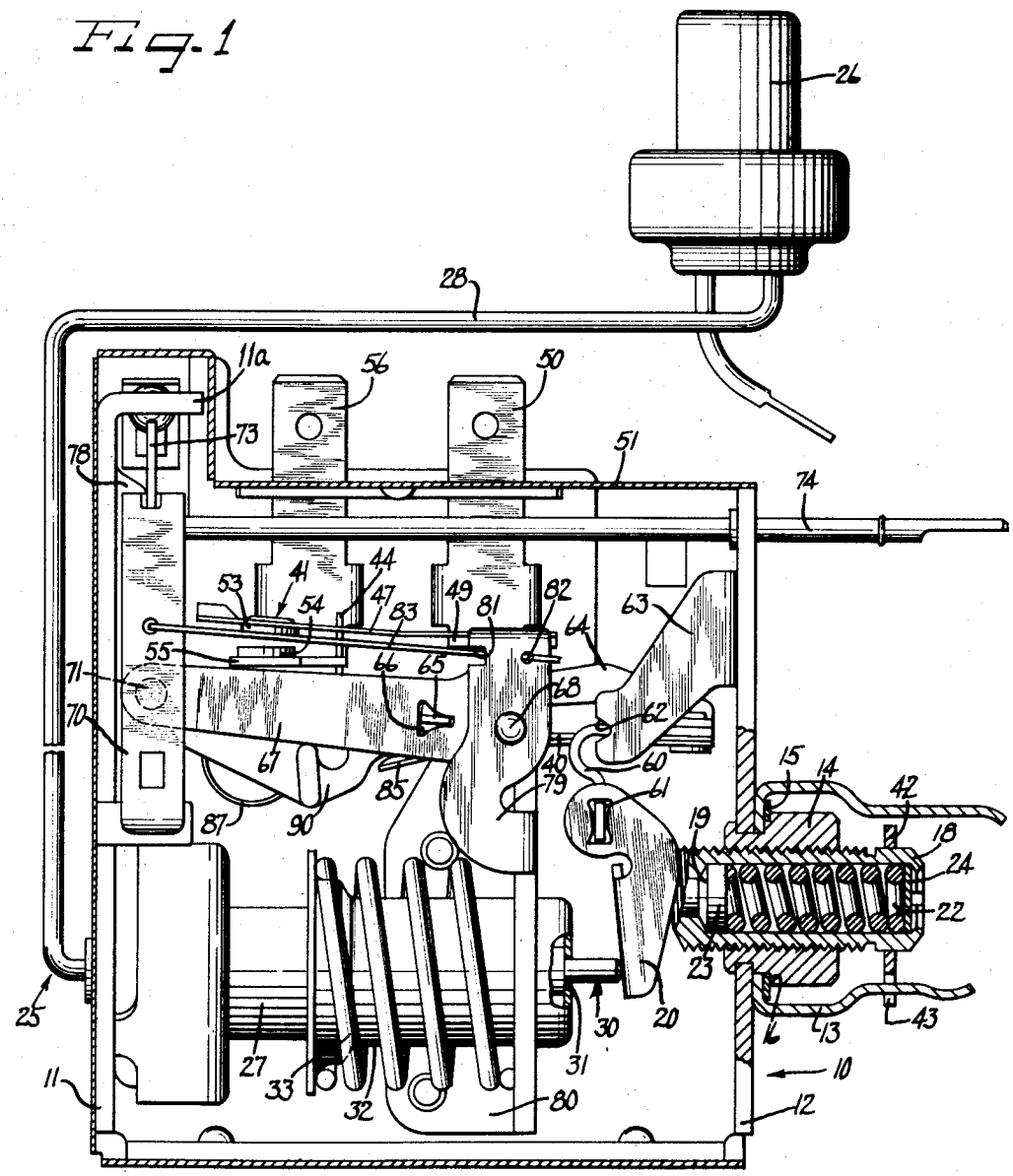
Figure 1 is a partially sectioned plan view of applicant's device showing the electrical contacts in the open position.

In the embodiment of the invention illustrated in the drawing, a frame 10 generally U-shaped in cross section and having parallel legs 11 and 12 extending from the base of the U forms the frame for the casing for the switch.

The leg 12 is shown as having an anchor 13 for a dial knob (not shown) abutting the outer side thereof and rotatably mounted on an internally threaded boss 14 extending through the leg 12 and spun or otherwise secured thereto. A friction spring washer 15 is shown as being interposed between a shoulder 16 of the boss 14 and the inner face of the portion of the anchor 13 engaging the outside of the leg 12, to prevent unintentional rotation of the anchor.

The boss 14 is shown as having a hollow adjusting screw 18 threaded therein and extending within the inside of the leg 12 into the interior of the switch casing. The hollow adjusting screw 18 forms an adjustable mounting for a plunger 19 slidably extending therethrough and forming a fulcrum for a snap lever 20 at its inner end. A relatively heavy overtravel safety spring 22 is mounted within the hollow adjusting screw 18 and abuts a head 23 of the plunger 19 at its inner end and a disk 24 at its outer end, shown as being retained within the hollow adjusting screw 18 by bending an inner wall portion of the adjusting screw into engagement therewith.

The present invention contemplates the use of a remote sensing control unit, indicated generally at 25, which is fully shown and described in detail in a copending application of Thomas B. Chace entitled "Air Conditioner Control" which has been assigned to the same assignee as the present invention. The remote sensing control unit 25 comprises generally a sensing unit 26, an actuating unit 27 and a capillary tube 28 connected therebetween. Since this device does not form a part of applicant's invention it is here deemed sufficient to relate that the power member 30 having a shouldered portion 31 on the outer end thereof is extensible from the actuating unit 27 upon predetermined increases in ambient temperature about the sensing unit 26, which can be remotely located from the switch 10. It should also be noted that while the power member 30 is extensible from the actuating unit 27 upon increases in ambient temperature about the sensing unit 26 the power member is retractable by means of a spring saddle or retainer 32 which abuts the shoulder 31 of the power member 30 and the spring member 33.

The overtravel safety spring 22 within the hollow adjusting screw 18 is sufficiently strong to normally act as a solid member and hold the plunger 19 in position to provide a fixed fulcrum for the snap lever 20 but to accommodate the plunger 19 to yield upon overtravel of a power member or piston 30 of the thermal actuating unit 27 to prevent damage of a snap blade 40 of a snap acting switch 41, upon over-temperature conditions about the sensing unit 26 and upon conditions where the plunger 19 is adjusted to effect operation of the switch at a substantially lower temperature than the ambient temperature to which the sensing unit 26 is subjected as will be more clearly explained hereafter in detail.

A calibration plate 42 is fixed to the adjusting screw 18 and has an arm 43 engageable with the anchor 13, to effect turning movement of the calibration plate 42 and the adjusting screw 18 upon turning movement of the anchor 13, as by a dial knob (not shown), to vary the spacing between the inner end of the plunger 19 and the reduced diameter engaging end of the power member or piston 30 of the actuating unit 27. The farther away the inner end of the plunger 19 is from the end of the reduced diameter end of the power member 30, the greater will be the travel of the power member required to pivot the snap lever 20 and effect opening of the switch 41 as will hereinafter become apparent.

The snap acting switch 41 is shown as comprising a spring metal switch arm 47 rivited or otherwise secured to an inturned leg 49 of a terminal 50, extending through an end cover 51 for the switch casing, and insulated therefrom. The switch arm 47 is preferably made from a spring material having good electrical conductivity, such as commercial bronze or beryllium copper and has a contact 53 on its free end, engageable with a stationary contact 54 on an inturned leg 55 of a terminal 56 extending through the end wall 51 and suitably insulated therefrom.

An angular lever arm 60 is mounted for limited pivotal movement within an hour-glass aperture 61 in the lever 20 and is also arranged to rock within a groove 62 in the pivot bracket 63 and is rigidly connected (as shown) to a motion translation bracket 64. An inwardly bent lug 65 on the motion translation bracket 64, projects through an aperture 66 in a pawl lever 67 which is arranged for pivotal movement about a rivet 68.

It will now be seen, with particular reference to Figures 4 and 5, that a pawl 70, medially movably connected at 71 to the pawl lever 67 and having a pair of depending tines 72 on the outer end thereof, is arranged to engage and rotate the ratchet wheel 73 which is rigidly connected to a cycle adjusting shaft 74 journaled for rotatable movement in leg 12 and in an integral boss 78 of leg 11. It will further be noted that a ratchet ball 75 coacts with the outer edge of the ratchet wheel 73 to positively position the ratchet wheel after each pushing motion of the pawl 70 and that the ball is spring pressed against the outer edge of the ratchet wheel by a spring member 76 which is attached to a side wall of the housing 10. Furthermore, the ratchet ball 75 is maintained in its proper position by an encircling guide portion 11a of the leg 11.

The arm 79 of the supporting bracket 80 is provided with a notch 81 along one edge thereof and with a small aperture 82 therein, within which is anchored a spring wire member 83, the other end of which bears down on the pawl 70 holding it resiliently in contact with the ratchet wheel.

Referring now to Figure 7, the snap blade 40 which has been described as being connected at its lower end portion to the angular lever 60 is abutted at its outer free end by a recessed portion 86 of an overcenter spring 87 as is fully shown and described in copending application No. 660,633.

An operator 44, forked at one end and having a tongue at the other, serves to interconnect the snap blade 40 and switch arm 47. The tongue of the operator 44 extends through a slot, not shown, in the snap blade 40 and has its forked end portion received in notches in the edges of the switch arm 47 so that upon movement of the free end of the snap blade 40 toward the inturned leg 55 the switch arm 47 and contact 53 on the outer free end thereof will be moved out of engagement with the stationary contact 54 as will hereinafter be more clearly explained.

A return spring blade 85 is attached to the angular lever 60 at its lower end portion and abuts, at its upper end portion, a reaction block 90, which may be made of Bakelite or any other suitable material, and serves to return the angular lever 60 and snap lever 20 upon cooling of the remote sensing control element and upon retractable movement of the power member or piston 30 with respect to the actuating unit 27.

It may now clearly be seen with respect to the foregoing description and the detailed drawings that the anchor 13 may be adjusted by the operator to preselect a certain temperature position and that the ratchet wheel 73 may be manually adjusted by means of a dial knob (not shown) mounted on the outer end of the cycle shaft 74 in a clockwise direction to obtain any desired number of thermostat cycles as are indicated on the face of the dial.

Assuming that the component parts of the operating mechanism are in the position illustrated in Figure 3 the energizing circuit will be closed and heating of the interior of the drier or other mechanism with which this device is associated will be effected. When the ambient temperature surrounding the sensing portion 26 of the remote sensing control unit reaches the fusion point of the thermally expansible material within the sensing unit the power member or piston 30 will be extensibly moved from the actuating unit by capillary action as has been more fully described in the copending application of Thomas B. Chace for an "Air Condition Control" which has been assigned to the same assignee as the present invention. Extensible movement of the piston 30 will pivot the snap lever 20 about the plunger 19 in a counter-clockwise direction. Adjustable movement of the end of the plunger 19 away from the reduced diameter end of the power member 30 will, therefore, increase the temperature at which the switch 41 opens. In a contrary manner, adjustable movement of the end of the plunger 19 toward the reduced diameter end of the power member 30 will reduce the travel of the power member 30 required to effect the opening of the switch 41, and will therefore reduce the temperature at which the switch operates.

The counter-clockwise rotation of the snap lever will rotate the angular lever arm 60 and the connecting motion translation bracket 64 in a clockwise direction about the pivotal groove 62. The clockwise rotation of the motion translation bracket 64 will move the outer free end of the snap blade 40 to a position past the center axis of overcenter spring 87 so that the blade will snap quickly toward the inturned leg 55 and the operator 44 will move the switch arm 47 and the contact 53 on the outer free end thereof out of engagement with the stationary contact 54 to deenergize the heating unit (not shown) of the drier. At the same time, clockwise rotation of the motion translation bracket 64 will act to rotate the pawl lever 67 in a clockwise direction about the pivotal rivet 68 which action will act to longitudinally move the pawl 70 a sufficient distance to rotate the ratchet wheel 73 one notch.

Thus, when the energizing circuit across the contacts 53 and 54 is opened in this manner, the heating coil (not shown) in the drier will be deenergized and the ambient temperature about the sensing portion 26 of the remote sensing control unit 25 will gradually be lowered to effect retractable movement of the piston 30 with respect to the actuating unit 27. As the piston 30 retracts the return spring 85 reacting against the block 90 will function to move the angular lever arm 60 and motion translation bracket 64 in a counter-clockwise direction with respect to the pivot 62 to thus move the outer free end of the snap blade 40 away from terminal lug 55. When the snap blade 40 reaches an overcenter position with respect to the overcenter spring member 87 the blade 40 will be snapped quickly downwardly to thus permit the switch arm 47 to move to its normal position wherein the contact 53 on the outer end thereof lies in engagement with the stationary contact 54 to thus re-energize the heating coil (not shown).

This cycle will be continued again and again until the ratchet wheel 73 has been moved to the position illustrated in Figure 6. In this position the shouldered stud 100 on the face of the wheel will coact with the end of the movable spring metal switch arm 47 so that upon the next incremental rotational movement of the wheel the spring metal switch arm 47 having movable contact 53 on the outer end thereof will be moved out of engagement with the stationary contact 54 to thereby open the energizing circuit. In this manner, when the ambient temperature surrounding the sensing portion 26 of remote control unit 25 becomes lowered to the extent to effect retractable movement of the piston 30 the piston 30 will move retractably with respect to the actuating unit 27 and all of the operating parts within the device will again be moved to the position illustrated in Figure 3 with the exception of the spring metal switch arm 47 which will be held in spaced relation with respect to the contact 54 by the shouldered stud 100 on the face of the ratchet wheel 73. Further manual rotation of the cycle adjusting shaft 74 will thus be required to close the energizing circuit and to begin the cycling operation again.

Since it is necessary to prevent counter-clockwise rotation of the ratchet wheel 73, the pawl 70 is provided with a downwardly projecting lug 90, opposite a lip 91 projecting from the frame member, so that the lug 90 will contact the lip 91 whenever an attempt is made to rotate the ratchet wheel in a counter-clockwise direction.

With the present control device, it is obviously advantageous to be able to adjust the temperature amplitude of the thermostat within close limits. To this end, the overcenter spring 87 of the thermostat snap action mechanism is provided with a pivot screw adjustment 110, illustrated particularly in Figure 7 of the drawings to vary the spring resistance to the movement of snap blade 40. The adjusting pin 110 is threadedly mounted within an aperture 111 in a recessed portion 112 of the leg 11. The pin 110 is slotted as at 113 on the outer end thereof to provide a means for readily adjusting the pin as by a screwdriver or the like and has a lock nut 114 on the outer end thereof to maintain the pin 110 in a predetermined desired position. Obviously, adjustable movement of the pin 110 inwardly with respect to the leg 11 will increase the force necessary to move the spring member 87 from one overcenter position to another.

It should here be noted that while lever 20 has been referred to as a snap lever, in actual use the lever does not snap but, in fact, moves rather slowly. Since, however, the lever imparts snap action to the switch 41, it has been termed a snap lever to indicate that movement thereof imparts snapping motion to spring members 40 and 47.

It will herein be understood that this embodiment of the invention has been used for illustrative purposes only and that various modifications and variations of the present invention may be effected without departing from the novel spirit and scope of the concepts thereof.

I claim as my invention:

1. A control mechanism for clothes driers and the like comprising, in combination, a switch casing, a rockable snap blade and lever within said casing, an overcenter spring rockingly mounted at one end in said casing in advance of said snap blade and having rocking engagement with said snap blade at its opposite end, thermal sensitive actuating means operatively engageable with said snap lever, a manually rotatable ratchet wheel within said casing, a pawl engaging said ratchet wheel and intermittently movable to rotate said ratchet wheel through a predetermined arc, a movable contact within said casing operable in one position to close an electrical energizing circuit and in another position to open the energizing circuit, motion translation means connecting said snap lever with said pawl and operable upon movement thereof in one direction to move said contact out of its closed circuit position, and abutment means on the face of said ratchet wheel for intermittently moving said contact out of its said closed position.

2. A control mechanism for clothes driers and the like comprising, in combination, a switch casing, a rockable snap blade and lever within said casing, an overcenter spring rockingly mounted at one end in said casing in advance of said snap blade and having rocking engagement with said snap blade at its opposite end, thermal responsive means for imparting rocking motion to said snap lever, a manually rotatable ratchet wheel within said casing, a pawl engaging said ratchet wheel and intermittently movable to rotate said ratchet wheel through a predetermined arc, a movable contact within said casing operable in one position to close an electrical energizing circuit and in another position to open the energizing circuit, motion translation means connecting said snap lever with said pawl and operable upon movement thereof in one direction to move said contact out of its closed circuit position, and abutment means on the face of said ratchet wheel for intermittently moving said contact out of its closed position.

3. A control mechanism for clothes driers and the like comprising, in combination, a switch casing, a rockable snap blade and lever within said casing, an overcenter spring rockingly mounted at one end in said casing in advance of said snap blade and having rocking engagement with said snap blade at its opposite end, means for adjusting the fulcrum of said overcenter spring, thermal sensitive actuating means operatively engageable with said snap lever, a manually rotatable ratchet wheel within said casing, a pawl engaging said ratchet wheel and intermittently movable to rotate said ratchet wheel through a predetermined arc, a movable contact within said casing operable in one position to close an electrical energizing circuit and in another position to open the energizing circuit, motion translation means connecting said snap lever with said pawl and operable upon movement thereof in one direction to move said contact out of its closed circuit position, and abutment means on the face of said ratchet wheel for intermittently moving said contact out of its said closed position.

4. A control mechanism for clothes driers and the like comprising, in combination, a switch casing, a rockable snap blade and lever within said casing, an overcenter spring rockingly mounted at one end in said casing in advance of said snap blade and having rocking engagement with said snap blade at its opposite end, means for adjusting the fulcrum of said overcenter spring, a stationary electrical contact within said switch casing, movable contact means normally biased into engagement with said stationary contact, an operator interconnecting said snap blade and said movable contact means operable upon movement thereof in one direction, by said snap blade to move said movable contact means out of engagement with said stationary contact, thermal sensitive actuating means operatively engageable with said snap lever, a rotatable ratchet wheel within said casing, a pawl engaging said ratchet wheel to incrementally move said ratchet wheel through a predetermined arc, and abutment means on said ratchet wheel for holding said movable contact means out of engagement with said stationary contact when said ratchet wheel has been rotated to a certain predetermined position.

5. A control mechanism for clothes driers and the like comprising, in combination, a switch casing, a rockable snap blade and lever within said casing, an overcenter spring rockingly mounted at one end in said casing in advance of said snap blade and having rocking engagement with said snap blade at its opposite end, a stationary electrical contact within said switch casing, movable contact means normally biased into engagement with said stationary contact, an operator interconnecting said snap blade and said movable contact means operable upon movement thereof in one direction by said snap blade to move said movable contact means out of engagement with said stationary contact, thermal sensitive actuating means operatively engageable with said snap lever, a rotatable ratchet wheel within said casing, a pawl engaging said ratchet wheel to incrementally move said ratchet wheel through a predetermined arc, and abutment means on said ratchet wheel for holding said movable contact means out of engagement with said stationary contact when said ratchet wheel has been rotated to a certain predetermined position.

6. A switch control comprising a pair of relatively movable electrical contacts, means biasing one of said contacts to a closed circuit position, thermally sensitive power means having an element extensible therefrom upon predetermined ambient temperature conditions therearound, means interconnecting said element with at least one of said contacts to move said contacts relatively apart to an open circuit position upon extensible movement of said element from said power means, and means for moving said contacts relatively apart irrespective of the position of said element.

7. A switch control mechanism comprising a pair of relatively movable electrical contacts, means biasing one of said contacts to a closed circuit position, thermally sensitive power means having an element extensible therefrom upon predetermined ambient temperature conditions therearound, means interconnecting said element with at least one of said contacts to move said contacts relatively apart to an open circuit position upon extensible movement of said element from said power means, a cycling wheel, means moving said cycling wheel through a predetermined arc upon an extensible movement of said element from said power means, and abutment means extending from said wheel and engageable with at least one of said contacts to move said contacts relatively apart when said wheel moves to a predetermined rotated position.

8. A switch control mechanism comprising a pair of relatively movable electrical contacts, means biasing one of said contacts to a closed circuit position, thermally sensitive power means having an element extensible therefrom upon predetermined ambient temperature conditions therearound, means interconnecting said element with at least one of said contacts to move said contacts relatively apart to an open circuit position upon extensible movement of said element from said power means, a ratchet wheel, a pawl engageable with said ratchet wheel and reciprocably movable to rotate said ratchet wheel through a predetermined arc, means for effecting axial movement of said pawl upon extensible movement of said element from said power means, and abutment means extending from said ratchet wheel and engageable with at least one of said contacts to move said contacts relatively apart when said wheel moves to a predetermined rotated position.

9. A switch control mechanism comprising a pair of relatively movable electrical contacts, means biasing one of said contacts to a closed circuit position, thermally sensitive power means having an element extensible therefrom upon predetermined ambient temperature conditions therearound, means interconnecting said element with at least one of said contacts to move said contacts relatively apart to an open circuit position upon extensible movement of said element from said power means, a ratchet wheel, a pawl engageable with said ratchet wheel and reciprocably movable to rotate said ratchet wheel through a predetermined arc, means for effecting axial movement of said pawl upon extensible movement of said element from said power means, abutment means extending from said ratchet wheel and engageable with at least one of said contacts to move said contacts relatively apart when said wheel moves to a predetermined rotated position, and means for effecting rotatable movement of said ratchet wheel irrespective of the position of said pawl and said element.

References Cited in the file of this patent

UNITED STATES PATENTS

| | | |
|---|---|---|
| 2,524,438 | Graves | Oct. 3, 1950 |
| 2,596,039 | McCormick | May 6, 1952 |
| 2,658,121 | Gray et al. | Nov. 3, 1953 |
| 2,712,579 | Raney | July 5, 1955 |
| 2,775,047 | Morrison | Dec. 25, 1956 |
| 2,830,766 | Algino | Apr. 15, 1958 |